Jan. 2, 1940.    T. H. NAKKEN    2,185,221
THREE DIMENSIONAL PHOTOGRAPH AND MOTION PICTURE
Original Filed Sept. 12, 1933    2 Sheets-Sheet 1
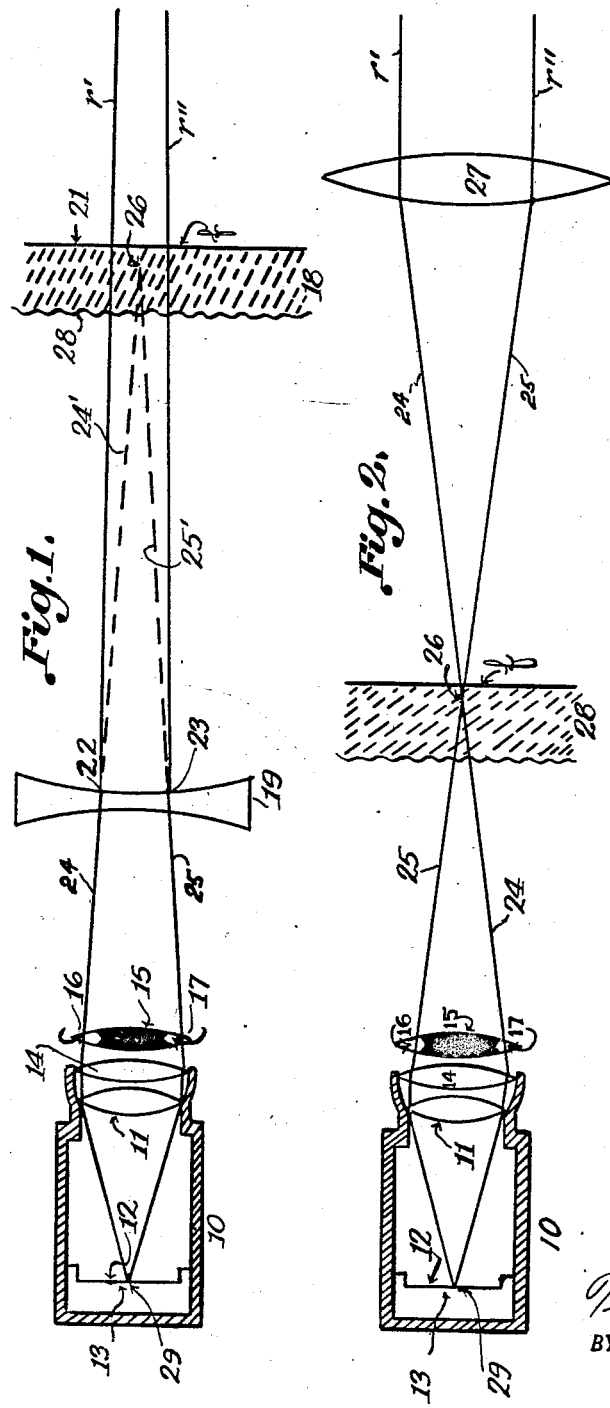
Fig.7
Fig.6
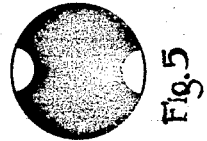
Fig.5
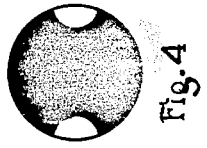
Fig.4
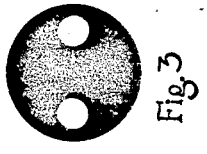
Fig.3
INVENTOR.
Theodorus H Nakken
BY
William L Morris
ATTORNEY.

Jan. 2, 1940.          T. H. NAKKEN                2,185,221
           THREE DIMENSIONAL PHOTOGRAPH AND MOTION PICTURE
                 Original Filed Sept. 12, 1933    2 Sheets-Sheet 2

TheoDorus H. Nakken.
INVENTOR.

BY
ATTORNEY.

Patented Jan. 2, 1940

2,185,221

UNITED STATES PATENT OFFICE 2,185,221

THREE DIMENSIONAL PHOTOGRAPH AND MOTION PICTURE

Theodorus H. Nakken, New York, N. Y., assignor to Tri-Mension Films, Inc., New York, N. Y., a corporation of Delaware Refile of abandoned application Serial No. 689,063, September 12, 1933. This application June 2, 1937, Serial No. 146,074. Renewed March 30, 1939

18 Claims. (Cl. 88—16.6)

The present invention relates to stereoscopic cameras, and to means and methods for the production of stereographic photographs, in both the still and motion picture arts. More particularly, the invention concerns a mechanical production of stereographic effects in a single photograph, or image, as distinguished from the production of such effects by mere optical illusion, or by physiological superposition, within the brain, of a plurality of different photographs or images of the scene.

This application is a refiling of my former application Serial No. 689,063, filed September 12, 1933, which became abandoned for failure to prosecute the same in accordance with the patent statutes.

It is understood that the terms 'stereographic' and 'stereoscopic' are commonly used in a somewhat narrow sense as denoting something which necessarily involves that physiological process whereby separate right and left eye images are superposed or merged in the brain to produce three-dimensional effects. The terms are here used, however, in a broader sense, as descriptive of a three-dimensional effect, whether had with one or two eyes, and without reference to any physiological merging of right and left eye views within the brain.

Attempts at stereoscopic photography have long been made along a number of lines. One line of effort has been that in which two photographs or films are printed in different colors, to be viewed through differently colored eyepieces, so that one, and one only, of the images falls into each eye of the spectator. In this class may be placed all devices in which so-called 'analysers' are employed, either in the form of individual eye glasses, or as special theatrical devices. Commercial success in this class has been unattainable, among other reasons, because probably thirty percent of the people have defective eyesight, and thus cannot get proper stereoscopic effects; because of lack of will on the part of the spectator to co-operate by wearing the special glasses, or to sit in stiff positions; and because of the cost of installation of the devices.

Again, right and left images have been alternated in projection. Results have here been theoretical. These methods depend on the assumption that, through retention of image, a blending effect will be obtained. In practice such attempts have failed, for the simple reason that the images have heretofore failed to blend.

Yet, again, two separated diaphragms or shutters have been employed in connection with one lens of large diameter; to the end, that right and left eye images might be simultaneously cast therethrough, for merger by the lens, into a single, three-dimensional image. Desultory efforts of this class over a long period of time, have been productive of little of practical consequence. This scheme is in effect a masking of part of the lens, not to create any right and left eye viewing fields therethrough, (for obviously these already existed), but to eliminate those active intermediate lens areas, which by blending such right and left, and all other fields of the lens into one another, destroyed the distinctiveness of any differing views, taken from different points, and at different angles of vision through the lens, and gave to the whole that flattening action generally characteristic of large lenses.

A large high-speed lens, by reason of its capacity for light, and for looking 'around' an object and viewing the same from various angles of vision, would be ideal in photography, except for parallax. Parallax, however, imposes the quite rigid condition that, where any scene is viewed from points disposed over a substantial arc of angular vision, all objects, and parts of objects, in the scene must be in practically one plane. The shallow depth of scene thus prescribed to large high-speed lenses precludes the use of such lenses in ordinary motion picture, and other camera work. Any idea, therefore, of utilizing a lens of such large diameter as to provide viewing fields therethrough, of interpupillary spacing, and of masking the lens except at such viewing fields, to eliminate flattening effects, and to attain the stereoscopy naturally to be expected from the superposition of distinct views of an object, taken from different angles of vision, was for all practical purposes foredoomed to failure, because of the problem presented by the phenomenon of parallax, which it remained for this invention to solve.

Nevertheless, it is by way of this third class, that success in stereographic pictures has been attained in the present invention; and it follows, from the above, that such success has been reached by a solution of the problem of parallax. This problem is well illustrated by the fact that if we place one pencil some distance behind another, and focus the eyes on the front pencil, the rear pencil will be seen in duplicate; the right eye view thereof appearing, out of position, to the left of the front pencil, and the left eye view thereof appearing, out of position, to the right of the front pencil. Similarly, if we focus on the rear pencil, the front pencil appears in duplicate. In other words, in all such instances, we have parallax. It is only when both pencils are brought into the relatively shallow plane of true focus, that both are seen correctly.

In the solution of this problem in the present invention, advantage is taken of the fact; first, that whereas it is impossible to condense, as to depth, the actual scene, it is nevertheless possible, as for instance by viewing through a concave lens, to create, of any scene, even of infinite depth, an image which may have a depth of the order of say one to two inches only; and second, that camera objectives are readily attainable which will sharply focus throughout any such small depth of image. Since, however, the image is three-dimensional, different, right and left, or other opposed and spaced, views thereof may be had, as for example, by means of the single lens of large diameter, with two shutters or diaphragms, heretofore used in connection with the third class of experiments, above mentioned. Both views being taken through the one large lens, the several different images cast therethrough, and through the camera objection, will be superposed and merged at the plane of the camera film or plate, into a single stereographic image of the scene; in which image all objects in the scene will appear sharply focussed, and in which image, therefore, there will be no parallax.

The object of the invention is, then, the optical condensation of any scene, into an image thereof, which has depth, so small with respect to the true depth of the scene, that substantially all objects therein are within one focal setting, but which nevertheless has such appreciable depth as to be three-dimensional; and the photographing of such image from opposed and spaced viewpoints, to produce a plurality of images or views, different as to angle, of the first image; thereafter causing such several different images of the first image to be superposed and merged into a single stereographic image of the scene.

As to apparatus, an object of the invention is a structure comprising a lens, or mirror, for casting, of a scene, an image which is of such small depth that all objects therein are substantially at one focal plane, but which image has such depth as to be appreciably three-dimensional; another lens having opposed and spaced viewing fields, with means for masking the light between such fields; the diameter of the latter lens being large enough to permit a spacing of its viewing fields, such that appreciable different views, at different angles, may be had therethrough of the image cast by the first lens or mirror; and an objective through which the several images from the large lens are thrown together on a photographic plate or film, as a single stereographic image of the scene.

It has just been stated that a convex lens or mirror may be used instead of a concave lens for creating the original image of the scene. For compactness and lightness of structure, and for other reasons, however, the concave lens is the more practicable for ordinary camera work. The image of the concave lens is a virtual image thrown to the front of the lens; whereas the image of a convex lens would be a real image thrown to the rear of that lens. With the concave lens, therefore, the spacing of that lens with respect to the large masked lens may be much more compact than in the case of a convex lens, and there will be no invention of real images from the masked lens, such as with a convex lens might necessitate modification of the film feeding mechanism now in general use. A concave lens, furthermore, has a universal focussing effect, not produced by a convex lens, and which vastly facilitates the creation of a three-dimensional image of size and character adaptable for portable camera work. Again, in such use of a concave lens, there is entirely eliminated that distorted enlargement of the nearer parts of an object, which has long been the plague of photography. The mirror, while entirely practicable as a substitute for the concave lens, in certain applications of the invention, requires certain well known corrective features, and involves structural arrangements, rendering it not so adaptable to ordinary camera work as the concave lens.

It will be apparent from the above that an important feature of the invention is the large lens which provides the opposed and spaced fields through which is photographed the original image of the scene, as cast by the concave lens or its equivalent. The size of this lens will naturally to some degree depend upon the degree of stereoscopic effect desired. If, for instance, the opposed viewing fields are to be spaced the distance apart of the human eyes, or interpupillary distance of approximately 60 mm., the lens will have to be of a size to permit such spacing. Since, however, in the present invention there is eliminated all call for that physiological merging in the brain of different images received from the two eyes, we are here in nowise restricted to a 60 mm., or interpupillary spacing, of the viewing fields of the lens. Greatly exaggerated and more intense stereoscopic effects than the human eyes alone could ever perceive are here perfectly possible. Such exaggerated effects may be had by simply spacing the viewing fields in the lens at desired distances greater than the interpupillary distance, the diameter of the lens being increased if necessary.

Due to the fact, however, that the human being has only two, laterally spaced eyes, whereas the lens may have not only two laterally spaced viewing fields, but also two vertically spaced viewing fields, and many other dispositions of viewing areas, the lens may see around an object with far greater stereoscopic effectiveness than can any person with his naked eyes; and hence, with proper selection as to number and disposition of viewing fields in the lens, a stereoscopic effect equal to, or greater than that perceivable by the eyes, may be had with a lens in which the spacing of opposed viewing fields is less than interpupillary distance. In the practice of the present invention, for example, remarkably plastic effects have been obtained with a lens of an overall diameter of only 43 mm.

The masking of the lens to define the opposed viewing fields thereof may be effected in many ways; and the possible designs of the fields, as to size, shape and disposition, are multitudinous. In the most obvious applications of the invention, the mask may be made in opaque paint applied directly upon one face of the lens, or may be cut in an opaque paster to be stuck to the face of the lens. As to design of viewing areas, from two to four, or more, openings of almost any shape, circularly disposed in the mask around, and at a distance from the axis of the lens, will suffice. The mask, however, may be formed by the mere application of a disk, square, or other shaped plaster or paint, to the lens, co-axially with the lens, but of smaller diameter, so as to leave the viewing field as a continuous band around a central opaque area. Diametrically opposed points on such continuous viewing band will function much as if such viewing points were segregated areas; and again, where the plurality of segregated areas are employed, the same may be connected by fine lines of functioning lens surface to effect some blending of the otherwise isolated views. In the accompanying drawings various designs of mask are shown; but it will be understood from the above that these are only illustrative of the invention.

The above and other objects and features of the invention will more fully appear upon reference to the accompanying drawings, in which:

Fig. 1 is a diagrammatic view showing the set-up and relative positions of lenses, camera objective, and film, and the position of photographed image of scene, where a concave lens is employed for casting such image.

Fig. 2 is a diagrammatic view showing the set-up and relative positions of lenses, camera objective, and film, and the position of photographed image of scene, where a convex lens is employed for casting the image.

Figs. 3 to 7, inclusive, illustrate different designs of mask.

Figure 8:
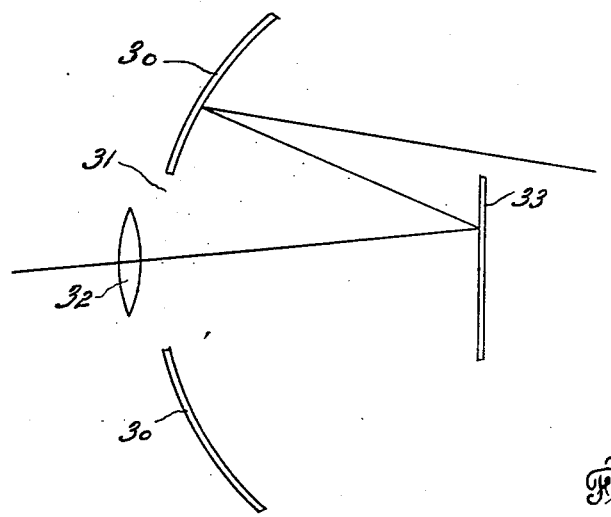

Fig. 8 is a diagrammatic view showing a set-up where a concave mirror is employed for casting the image.

Figure 9:
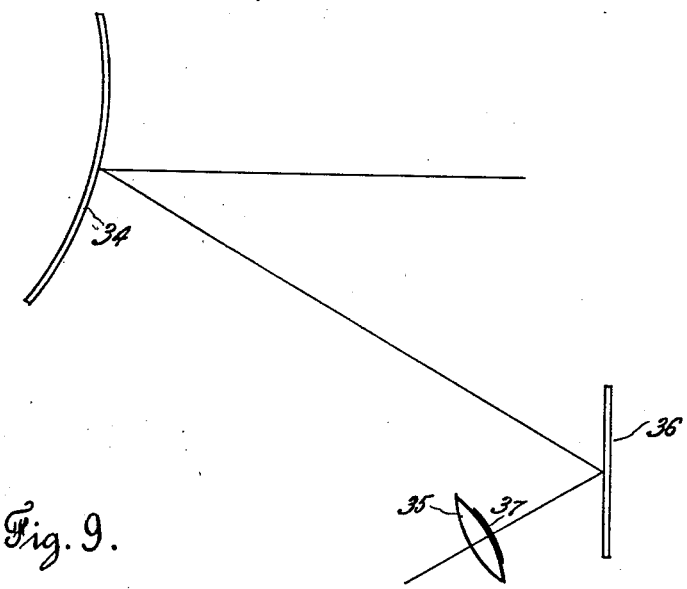

Fig. 9 is a diagrammatic view showing a set-up where a convex mirror is employed for casting the image.

Referring now to Fig. 1, a camera is indicated at 10, having an objective 11 of any ordinary or suitable lens-aggregate, to focus at the plane 12 of the film 13. Shown as set in front of the objective 11, but which may be made or considered as a part of the objective, is a lens 14. This lens 14 is the lens hereinbefore described as the lens of large diameter, for providing opposed and spaced viewing fields. The opaque mask which defines such viewing fields is diagrammatically indicated at 15; and, at 16 and 17, in the mask, are indicated, diagrammatically, opposed openings. Through these openings two different views, taken at different angles of vision, are had of the image 18. The views through the openings 16 and 17, by the refraction of light by lens 14 and objective 11, are superposed and merged as a single stereographic picture, on the film 13.

The scene, (not shown), but of which 18 is a virtual image, is to the right of the drawing, as indicated by the arrows in the drawing. This image, in Fig. 1, is cast by a concave lens 19, located in front of lens 14; and, as viewed through the openings 16 and 17 of lens 14, stands at 20, in front of lens 19. As hereinbefore stated, due to the different distances of the objects, and parts of objects, in the scene, the image 18 is three-dimensional, having an appreciable depth, indicated at 21; by reason of which the image offers the different perspective views had from the openings 16 and 17. The image, as to its depth and other dimensions, is of course vastly condensed with respect to the true depth and other dimensions of the scene itself. In fact, it is so condensed as to depth, that with proper design, and adjustment as to setting, of the objective 11 and lens 14, the image 18 throughout its entire depth is substantially at a single focal plane of the objective; and hence all features of the image are defined sharply, and without parallax.

Rays r' and r'' from the scene strike the concave lens 19 at points 22 and 23, from which they are refracted on lines 24 and 25 to the mask openings 16 and 17 of lens 14. As viewed from openings 16 and 17, these rays 24 and 25 appear to extend rectilinearly to the front of the concave lens 19, to a point of intersection 26, which locates the position of the plane of the image 18. The lens 19 defines the area of the image 18 in accordance with well known principles of optics, of which no exposition is here necessary.

In Fig. 2, a convex lens 27 is employed instead of the concave lens 19 of Fig. 1; with the result that a real image 28 is cast of the scene, instead of a virtual image as in Fig. 1; and the real image stands between the lens which casts the same, and the viewing lens 14, instead of in front of the casting lens, as in Fig. 1. Except as to the image 28 and lens 27, the corresponding parts are numbered similarly in the two figures. In further comparison of the two structures, it will be seen that the set-up of Fig. 2 is not as compact as in Fig. 1, for the reason that in Fig. 2 the viewing and image-casting lenses have much greater spacing than in Fig. 1; to accommodate the image between the same; and it will also be seen that in Fig. 2, the images thrown and to be superposed on the film are inverted with respect to the corresponding images thrown in the Fig. 1 structure.

Since there are certain standards as to size of film panel; and since, for any particular use, there may be restrictions as to the design of objective and space of set-up, which in turn may impose restrictions as to area, depth and location of the image to be photographed, there are certain optical laws to which it may be well here to direct attention.

Convex lenses and concave mirrors create, except under special circumstances, real images. Concave lenses and convex (also pane) mirrors create virtual images. All these images have small depth; for instance, the real image created by a convex lens for an object at infinity lies at a distance $f$ ($f$ being the focal length of the lens), behind the lens, and the real image of an object at a distance $2f$ in front of the lens lies at a distance of $2f$ behind the lens; so that the total depth of the real image is equal to $f$ for any scene extending from a distance $2f$ to infinity. In the case of a concave mirror the same law applies, except that the real image lies in front of the mirror. It can, however, easily be photographed.

On the other hand, it will be seen that with a concave lens the virtual image of an object at infinite distance is situated at a distance equal to $f$, its focal point and the images of nearer objects lie nearer than $f$, but all on the same side of the lens as the objects. In a convex mirror the virtual image lies within the same limits, but behind the mirror. Arrangements can be constructed to photograph all of these images, and it will be clear that, as their depth is generally less than $f$, and even considerably less than $f$, a large diameter objective may be used with complete success.

The characteristics of the virtual image, as observed through a concave lens, were analysed quite thoroughly by Thorier, who did this work in connection with a system for three color photography by Audibert, in which three objectives with appropriate color filters were placed behind a concave lens. He established an empirical formula, which states that if $f$ is the focus of the concave lens, and D the distance of the nearest object, the depth of the virtual image of a scene extending from D to infinity is equal to $F^2/D$. Thus, if $f$ be 10", and D be 100", the depth of the virtual image is $10^2/100$, which is equal to 1".

Referring to the drawings, let us assume that the objective, inclusive of the lens 14, has a 3½" focus, and 3½" diameter. This lens is focussed on the virtual image 16, and creates a real image of this virtual image on the film in the camera. As stated, this image 18 is, of course, much smaller than the actual scene; and we will assume that it is of such size that, in the photographing thereof onto the film, it may be reduced to one fourth of its linear dimensions, to be received by the standard film panel of ¾" x 1". This means, first, that it is about 17½" away from lens 14; and second, that it must have minimum dimensions of 3" x 6".

By tracing some of the rays from this virtual image, a few more important facts may be determined. From the point 26 in the image, it is seen that a cone of light proceeds to the lens 14 and has its base on the latter. Two of the outer rays 24—24' and 25—25' of this cone are shown on the drawings; and after passage of the rays of this cone through the lens 14, the same converge to the point 29 on the film.

It will be understood, of course, that the rays 24' and 25' are really non-existent, just as the point 26 is only imaginary. Actually, from a point in the scene (not shown), there issues a cone of light having 22—23 as the diameter of the base thereof at the lens 19, defined by the rays $r'$ and $r''$ continued as 24 and 25 to the lens 14.

It follows that the lens 14 can only photograph the amount of plasticity which is obtained with a lens of the diameter 22—23. If this diameter is of interpupillary length, about 60 mm., we shall have a plasticity at least equal to that had by normal vision; that is to say, where we use masks of two-point plasticity such as shown in Figs. 3, 4 and 5 of the drawings. If, however, we use masks of all-around plasticity, such as shown in Figs. 6 and 7 of the drawings, we shall, with this diameter base of 60 mm., obtain a plastic effect much in excess of that had in normal vision.

It is therefore a simple matter to ascertain the exact position for placement of the hollow lens 19; and this position being found, we shall know the focus which the divergent lens 14 should have. In the instance given, such focus would be about 12½" to 14". The determinant of of available plasticity has thus been shown to be the base of the cones of light rays falling upon the concave lens before refraction.

A remarkable fact in connection with the use of the invention is, that a large opening lens thereby functions as well as a small diameter lens, and has the same apparent depth; so that all objections against extreme speeds are removed at one stroke. Speeds equal to F.1 and even less become thoroughly practicable; which is of extreme importance, and is thus a salient feature of the invention. As a matter of fact, as will be elsewhere shown, by a judicious choice of the concave lens, any objective may be made to be almost completely universally focussed.

Another important advantage arising from the use of the combination of an ordinary objective with a concave front-lens at proper distance therefrom, is the complete elimination of that distortion found in the ordinary photograph and consisting of the disproportionate enlargement of nearby parts of objects. The reason for this distortion in ordinary photography is that therein the focal plane of nearby objects lies further back of the objective than that of a faraway object; so that nearby objects are proportionately less diminished in size than faraway objects. With a concave lens, on the other hand, the case is exactly reversed. Here the nearer objects form their virtual images nearer to the lens than those of the faraway objects. Hence nearby objects are relatively more reduced than faraway objects. If, therefore, in the present invention, the two parts of the lens aggregate are carefully chosen, it is impossible to photograph in exact proportion, with completely correct perspective; which, needless to say, adds to the impression of depth of three dimensionality to the spectator.

Referring now to Figs. 8 and 9, which illustrate the use of mirrors, instead of lenses, for casting the image, there is indicated in Fig. 8 a concave mirror 30, having a central aperture 31 through which the image is viewed by a lens 32. The concave mirror forms a real image in front of lens 32, and the masking may be at the flat mirror 33.

In Fig. 9, a convex mirror 34 forms a virtual image behind the lens 35, which latter views the image as reflected upon the flat mirror 36. A mask 37 is shown on the lens 35.

I claim:

1. A method of photography, consisting in the optical condensation of a scene into a single image thereof having a depth which is small with respect to the true depth of the scene, photographing said image through a plurality of spaced view-points with merger of the several images cast therethrough into a single real image.

2. A method of photography, consisting in the optical condensation of a scene into a single virtual image thereof having a depth which is small with respect to the true depth of the scene, photographing the virtual image through a plurality of spaced viewpoints with merger of the several images cast therethrough into a single real image.

3. A method of photography, consisting in the optical condensation of a scene into a single real image thereof having a depth which is small with respect to the true depth of the scene, photographing said image through a plurality of spaced viewpoints with merger of the several images cast therethrough into a single real image.

4. A stereoscopic picture-taking apparatus, comprising means adapted to cast, of a scene, an image having a depth which is small with respect to the true depth of the scene, and a lens, or lens aggregate, adapted to be focussed upon said image, and of a diameter sufficient to permit of the definition of opposed and spaced viewing fields of said image therethrough, and of a design to merge into a single real image said several opposed views, taken simultaneously through such fields, of said image of small depth; and means in the path of the light from said image of small depth to the plane of such merger for defining said opposed viewing fields by a masking of light between the same, to cause said merger of images to be stereographic.

5. A stereoscopic picture-taking apparatus, comprising a hollow or concave lens adapted to cast, of a scene, a virtual image having a depth which is small with respect to the true depth of the scene, and a lens, or lens aggregate, adapted to be focussed upon said virtual image, and of a diameter sufficient to permit of the definition of opposed and spaced viewing fields of said virtual image therethrough, and of a design to merge into a single real image said several opposed views," taken simultaneously through such fields, of said virtual image; and means in the path of the light from said virtual image to the plane of said merger for defining said opposed viewing fields by a masking of light between the same, to cause said merger of real images to be stereographic.

6. A stereoscopic picture-taking apparatus, comprising a convex lens adapted to cast, of a scene, a real image having a depth which is small with respect to the true depth of the scene, and a lens, or lens aggregate, adapted to be focussed upon said image, and of a diameter sufficient to permit of the definition of opposed and spaced viewing fields of said image therethrough, and of a design to merge into a single real image said several opposed views, taken simultaneously through such fields, of said first mentioned real image of small depth; and means in the path of the light from said real image of small depth to the plane of said merger for defining said opposed viewing fields by a masking of light between the same, to cause said merger to be stereographic.

7. A stereoscopic picture-taking apparatus, comprising means, adapted to cast, of a scene, an image having a depth which is small with respect to the true depth of the scene, and a lens, or lens aggregate, adapted to be focussed upon said image, and of a diameter surpassing the average distance between the human eyes; and means, in the path of the light from said image to the focal plane of said objective for defining opposed and spaced viewing fields through the objective, by a masking of light between such fields; so that images of said first-mentioned image are cast through said several viewing fields and superposed by said objective in the focal plane thereof as a stereographic compound or merger of the several images so cast.

8. A stereoscopic picture-taking apparatus, comprising an objective, means for masking the same except at selected opposed and separated viewing fields or portions thereof, means adapted to cast, of a scene, an image having a depth which is small with respect to the true depth of the scene; means for focussing said objective upon said image, and, through said opposed and separated viewing fields of the objective, casting and superposing a plurality of images of said first-mentioned image, to form a stereographic compound or merger of said several images at the focal plane of said objective.

9. A stereoscopic picture-taking apparatus, comprising an objective, means for masking the same except at selected opposed and separated viewing fields thereof, a hollow or concave lens mounted in front of said objective for casting, of a scene, a virtual image thereof having a depth which is small with respect to the true depth of the scene; means for focussing said objective upon said virtual image; and, through said opposed and separated viewing fields of the objective, casting and superposing a plurality of real images of said virtual image, to form a stereographic compound or merger of said several real images at the focal plane of said objective.

10. A stereoscopic picture-taking apparatus, comprising an objective, means for masking the same except at selected opposed and separated right and left eye viewing fields thereof, means adapted to cast, of a scene, an image having a depth which is small with respect to the true depth of the scene; means for focussing said objective upon said image, and, through said right and left eye viewing fields, casting and superposing a plurality of images of said first-mentioned image, to form a stereographic compound or merger of the right and left views at the focal plane of the objective.

11. A stereoscopic picture-taking apparatus, comprising means for effecting an optical condensation of a scene into an image thereof having a depth which is small with respect to the true depth of the scene, two opposed, opaquely separated lenses having a common focal point and a common focal axis, and the same speed; means for focussing said lenses upon said image, so that opposed and separated views of said image may be superposed and merged thereby, to form a single stereographic image of said first-mentioned image.

12. A stereoscopic picture-taking apparatus, comprising means for effecting an optical condensation of a scene into an image thereof having a depth which is small with respect to the true depth of the scene, two opposed, opaquely separated lenses having a common focal point and a common focal axis, and the same speed; and a lens, or lens aggregate, to the rear of said separated lenses and acting in conjunction therewith for superposing and merging said opposed and separated views into a single stereographic image of said first-mentioned image.

13. A camera comprising; an objective consisting of a lens, or lens aggregate; a convex lens of relatively large diameter located in front of said objective, and having opposed and opaquely separated viewing fields therethrough, so as to cast a plurality of different real images of an object through said objective; and a hollow or concave lens located in front of said large diameter convex lens, for optically condensing a scene into a virtual image thereof, which is of small depth relatively to the true depth of the scene, and upon which virtual image said relatively large convex lens is focussed; whereby said plurality of real images are different views of said virtual image, and are superposed and merged into a single stereographic image of said virtual image at the focal plane of the objective.

14. A method of photography consisting in the optical condensation of a scene into a single image thereof, which has depth so small with respect to the true depth of the scene, that substantially all objects therein are within one focal setting, but which nevertheless has such appreciable depth as to be three-dimensional; and the photographing of such image through opposed and spaced viewpoints, to produce a plurality of images or views, different as to angle, of the first image; with merger of the several images cast therethrough into a single stereographic image of the scene.

15. A stereoscopic picture-taking apparatus, comprising a lens for casting, of a scene, an image which is of such small depth that all objects therein are substantially at one focal plane, but which image has such depth as to be appreciably three-dimensional; another lens having opposed and spaced viewing fields, with means for masking light between such fields; the diameter of the latter lens being large enough to permit a spacing of its viewing fields such that appreciably different views at different angles may be had therethrough of the image cast by the first lens; and an objective through which the several images from the large lens are thrown together on a photographic plate or film, as a single stereographic image of the scene.

16. A stereoscopic picture-taking apparatus, comprising a mirror for casting, of a scene, an image which is of such small depth that all objects therein are substantially at one focal plane, but which image has such depth as to be appreciably three-dimensional; a lens having opposed and spaced viewing fields, and means for masking light between such fields; the diameter of the lens being large enough to permit a spacing of its viewing fields such that appreciably different views at different angles may be had therethrough of the image cast by the mirror; and an objective through which the several images from the lens are thrown together on a photographic plate or film, as a single stereographic image of the scene.

17. A stereoscopic picture-taking apparatus, comprising a concave mirror for casting, of a scene, an image which is of such small depth that all objects therein are substantially at one focal plane, but which image has such depth as to be appreciably three-dimensional; a lens having opposed and spaced viewing fields, and means for masking light between such fields; the diameter of the lens being large enough to permit a spacing of its viewing fields such that appreciably different views at different angles may be had therethrough of the image cast by the mirror; and an objective through which the several images from the lens are thrown together on a photographic plate or film, as a single stereographic image of the scene.

18. A stereoscopic picture-taking apparatus, comprising a convex mirror for casting, of a scene, an image which is of such small depth that all objects therein are substantially at one focal plane, but which image has such depth as to be appreciably three-dimensional: a lens having opposed and spaced viewing fields, and means for masking light between such fields; the diameter of the lens being large enough to permit a spacing of its viewing fields such that appreciably different views at different angles may be had therethrough of the image cast by the mirror; and an objective through which the several images from the lens are thrown together on a photographic plate or film, as a single stereographic image of the scene.

THEODORUS H. NAKKEN.